US009732868B2

United States Patent
Bertoldi et al.

(10) Patent No.: US 9,732,868 B2
(45) Date of Patent: Aug. 15, 2017

(54) HIGH RELIABILITY PRESSURE RELIEF VALVE

(71) Applicant: PREVCO SUBSEA, LLC, Fountain Hills, AZ (US)

(72) Inventors: John Bertoldi, Fountain Hills, AZ (US); Joseph Schimek, III, Destin, FL (US); John Head, Fountain Hills, AZ (US)

(73) Assignee: PREVCO SUBSEA, LLC, Fountain Hills, AZ (US)

( * ) Notice: Subject to any disclaimer, the term of this patent is extended or adjusted under 35 U.S.C. 154(b) by 238 days.

(21) Appl. No.: 14/248,271

(22) Filed: Apr. 8, 2014

(65) Prior Publication Data

US 2014/0360590 A1  Dec. 11, 2014

Related U.S. Application Data

(60) Provisional application No. 61/832,492, filed on Jun. 7, 2013.

(51) Int. Cl.
*F16K 17/04* (2006.01)

(52) U.S. Cl.
CPC ....... *F16K 17/048* (2013.01); *Y10T 137/0491* (2015.04); *Y10T 137/7838* (2015.04); *Y10T 137/7868* (2015.04)

(58) Field of Classification Search
CPC ......... Y10T 137/0491; Y10T 137/7841; Y10T 137/7922; Y10T 137/7738; Y10T 137/774; Y10T 137/7742; Y10T 137/7747; Y10T 137/7867; Y10T 137/7868; Y10T 137/7866; F16K 17/048; F16K 17/02; F16K 17/04; F16K 17/0413; F16K 17/042; F16K 17/044; F16K 17/24; F16K 17/28; F16K 17/30
USPC ....... 137/512, 513, 469, 471, 473, 478, 541, 137/454.2, 516.25, 516.29
See application file for complete search history.

(56) References Cited

U.S. PATENT DOCUMENTS

| | | | | |
|---|---|---|---|---|
| 2,420,370 A | * | 5/1947 | Hamilton | F16K 17/044 137/469 |
| 4,284,097 A | * | 8/1981 | Becker | E03C 1/106 137/218 |
| 4,392,507 A | | 7/1983 | Harris | |
| 4,953,588 A | | 9/1990 | Sands | |
| 5,664,601 A | * | 9/1997 | Chen | F16K 17/04 116/277 |
| 5,950,653 A | | 9/1999 | Folsom | |

(Continued)

OTHER PUBLICATIONS

Prevent definition; printed Sep. 30, 2016.*
Opposing definition; printed Sep. 30, 2016.*

*Primary Examiner* — Kevin Murphy
*Assistant Examiner* — Kelsey Rohman
(74) *Attorney, Agent, or Firm* — Inspired Idea Solutions Law Firm; Wayne Carroll (57) ABSTRACT

A pressure relief valve is disclosed with a first stage valve that is in series with a second stage valve, with an enclosed cavity between the first stage valve and the second stage valve. The first stage valve relieves pressure from an enclosure into the enclosed cavity between the stages, when the pressure is above a cracking pressure of the first stage valve. The second stage relieves pressure from the enclosed cavity when the pressure is above the cracking pressure of the second stage valve.

9 Claims, 5 Drawing Sheets

(56) References Cited

U.S. PATENT DOCUMENTS

| | | |
|---|---|---|
| 6,993,904 B2 | 2/2006 | Hazzard et al. |
| 2003/0000577 A1* | 1/2003 | Noll ........................ E03B 7/077 137/454.2 |
| 2007/0007364 A1* | 1/2007 | Gregory ................ B05B 1/3006 239/206 |
| 2010/0043901 A1 | 2/2010 | Richardson et al. |

* cited by examiner

FIG. 6

HIGH RELIABILITY PRESSURE RELIEF VALVE

CROSS REFERENCE TO RELATED APPLICATIONS

This application claims priority to a provisional application Ser. No. 61/832,492 Filed 7 Jun. 2013 which is a application, the disclosure of which is incorporated herein by reference in its entirety including specification, claims, and drawings.

BACKGROUND

1. Technical Field

This disclosure relates to pressure relief valves.

2. Background Art

In the subsea industry pressure relief valves with relatively low cracking pressures are often used as a safety device to prevent the buildup of inside pressure within a subsea electronics housing. Subsea housings are hydrostatic pressure vessels designed for external pressure and are typically not capable of withstanding even modest relative internal pressure without failure.

Significant Internal pressures can develop as the result of hydraulic leaks, battery off-gassing and or slow sea water leaks that cannot relieve internal pressure quickly enough during recovery to the surface.

Unfortunately pressure relief valves have a reputation for poor reliability in the subsea environment. Corrosion and fouling of the moving parts by suspended particulate matter can sometimes lead to failure by preventing the valve from reseating sufficiently to establish a reliable seal. While the use of redundant corrosion resistant materials and seals improve reliability of subsea pressure relief valves these enhancements do not address the fundamental problem of the mechanical parts within the valve; each being single point of failure.

BRIEF SUMMARY

The embodiments of the pressure relief valves disclosed relate to pressure relief valves for relieving pressure inside a chamber, including a chamber used in the deep sea or other high pressure environments with improved reliability over existing pressure relief valve designs. In an example embodiment, the relief valve includes a first stage with a first valve having a first cracking pressure value, and a second stage with a second valve, having a second cracking pressure value. An enclosed cavity is between the first stage and the second stage, so that the first valve relieves pressure above the first cracking pressure value from an enclosed housing into the enclosed cavity, and the second stage valve relieves pressure above the second cracking pressure value from the enclosed cavity into an outside environment.

The first valve may include a first body and a first poppet, and the second valve may include a second body and a second poppet. The first body may have an opening configured to receive the second body, with the second body occupying at least a portion of the opening. At least one seal may be placed between the first body and the second body. The enclosed cavity may be formed with a sealed space between the first body and second body.

The first valve may also include a first threaded stem connected to the first poppet and a first spring configured to keep the first valve in a closed position until the first spring is compressed. A first adjustment nut may be used to adjust the load on the first spring, with the first adjustment nut positioned on the first threaded stem to set the first cracking pressure value.

The first adjustment nut may be set so that the first cracking pressure value is higher than the second cracking pressure value. Alternatively, the first cracking pressure value may be approximately the same as the second cracking pressure value. In another embodiment, the first adjustment nut may be set so that the first cracking pressure value is lower than the second cracking pressure value.

The first adjustment nut may be set so the first cracking pressure is approximately within a first range. The second valve may include a second spring configured to keep the second valve in a closed position until the second spring is compressed, and a second adjustment nut to adjust the load on the second spring. The second adjustment nut may be set so the second cracking pressure is approximately within a second range.

A cap may be placed next to the second valve to prevent particles from entering the second valve. The cap may be attached to the second body in a manner so that the cap will be removed if a high rate of fluid passes through the second valve.

A high flow indicator may be attached to the second stage. The high flow indicator may be configured to indicate when a high flow of fluid has passed through the second valve.

The first valve may include a first threaded valve stem including a first thread lock device. The first adjustment nut may be placed on the first threaded valve stem so that it is in contact with the first thread lock device to prevent the first adjustment nut from moving due to vibration.

In another example embodiment, an enclosed housing may have an exterior and an interior, where the enclosed housing is configured to protect the interior from pressurized fluids on the exterior of the enclosed housing. The enclosed housing may also include a pressure relief port that allows fluid to pass from the interior of the enclosed housing to the exterior of the enclosed housing. The enclosed housing may include a pressure relief valve having a total cracking pressure value. The pressure relief valve may be fixed in the pressure relief port that is configured to allow fluid to pass in one direction from the interior of the enclosed housing to the exterior of the enclosed housing when fluid pressure on the interior of the enclosed housing is greater than the sum of fluid pressure on the exterior of the housing and the total cracking pressure value. The pressure relief valve may include a first stage valve, and a second stage valve, and an enclosed cavity between the first stage valve and the second stage valve.

The first stage valve may have a first cracking pressure value, and the second stage valve may have a second cracking pressure value that is lower than the first cracking pressure value. The first stage valve may be configured to allow fluid to pass in one direction from the interior of the housing into the enclosed cavity. The second stage valve may be configured to allow fluid to pass in one direction from the enclosed cavity to the exterior of the housing.

The enclosed housing may be configured to withstand fluid pressure, with a maximum fluid pressure up to the design operating pressure.

An example method of producing a high reliability pressure relief valve may include the steps of: assembling a first stage with a first pressure relief valve for relieving fluid pressure from an enclosed housing above a first cracking pressure value; assembling a second stage with a second pressure relief valve to relieve pressure above a second cracking pressure value; and assembling the first stage with the second stage in series, with an enclosed cavity between the first stage and the second stage, where the first stage relieves pressure above the first cracking pressure value from the enclosed housing into the enclosed cavity, and where the second stage relieves pressure above the second cracking pressure value from the enclosed cavity into an outside environment outside the enclosed housing.

The first cracking pressure value may be a higher pressure than the second cracking pressure value.

The example method may include the steps of: adjusting the first stage to set the first cracking pressure value; and adjusting the second stage to set the second cracking pressure value.

As will be made clear, the disclosed embodiments of the pressure relief valve provide important advantages in providing a highly reliable pressure relief system for enclosed housings in a high pressure environment.

DETAILED DESCRIPTION

Figure 1:
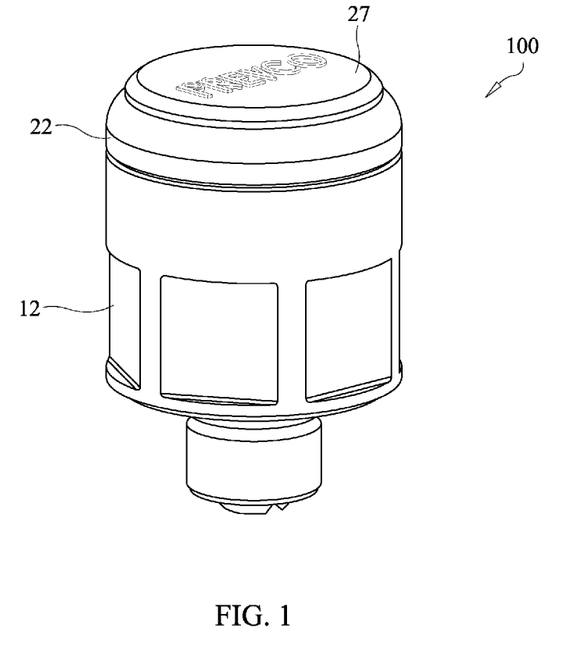
FIG. 1 is a perspective view of an embodiment of pressure relief valve.

In one embodiment of the invention, a pressure relief valve addresses the problem of failure of moving parts by housing two serially redundant pressure relief valves in a single corrosion resistant housing. An example pressure relief valve 100 is shown in FIG. 1, with a first housing 12, and a second housing 22, and a cap 27. The cap 27 prevents dust and particles from interfering with the operation of the pressure relief valve 100. The cap 27 in the example embodiment has an opening that allows fluid exiting the second valve 20 to pass through the cap 27.

In one embodiment a high flow indicator may be placed on the outside of the pressure relief valve, so that an inspection from the outside of the pressure relief valve will indicate that a high rate of flow has passed through the valve at some point. In some cases components such as electronics fail and produce a high volume of gas, or a large amount of heat that can increase the pressure inside a housing. Once the gas has exited through the relief valve, there may not be any indication that the component has failed as the relief valve will return to the closed position. For example, one cell in a multi-cell battery may fail, or one component may fail, with the system still operating. An indicator may be placed on the exterior of the pressure relief valve to indicate if high flow has occurred.

The cap 27, for example, may serve as an indicator of a problem or failure. When normal amounts of pressure are relieved through the pressure relief valve 100, the example cap 27 will not be moved or affected. In the event that there is a large amount of pressure that is relieved through the pressure relief valve 100, for example if an electronic component inside a housing with the pressure relief valve 100 had a failure that caused a sudden large amount of pressure inside the housing, then pressure will be released quickly and the cap 27 may be moved, or even removed by the action of the valve opening further than in normal operation, or by the action of the fluid passing quickly through the cap 27. In this way, inspection of the outside of the housing, by looking to see if the cap 27 has been moved or removed, may indicate whether there has been a failure of components inside the housing.

Figure 2:
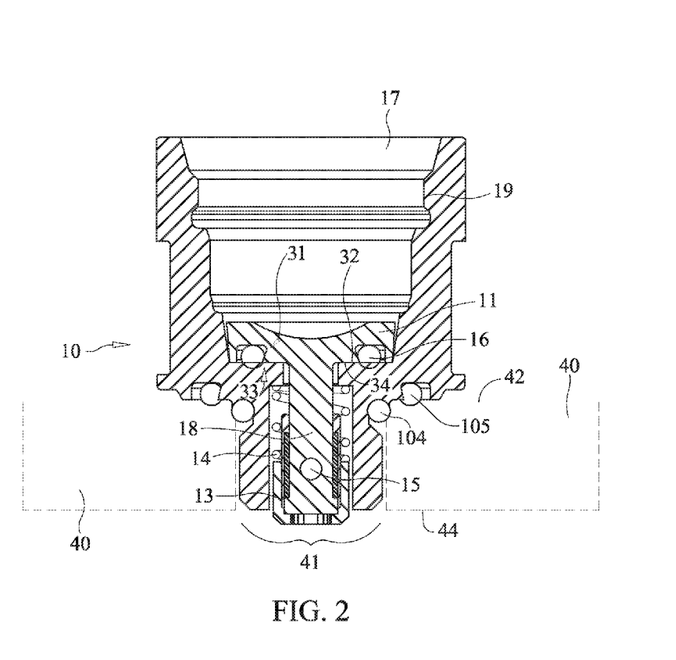
FIG. 2 is a cut away view of the first stage of an example pressure relief valve.

FIG. 2 is a cut away view through the center of the example pressure relief valve 100 of FIG. 1, showing a portion of the valve contained in the first housing 12. In this example embodiment, the first housing 12 includes a first stage valve 10, and an opening 17 with a threaded joint 19. The first stage valve 10 in this embodiment includes a spring loaded valve with a first poppet 11 that includes a first valve seal 16. The example first poppet 11 is connected to a first threaded stem 18, and first adjustment nut 13, attached to the first threaded stem 18. The first threaded nut 13, in this embodiment is used to adjust the load on a first spring 14. The example first stage valve 10 will have a cracking pressure that depends on the load on the first spring 14.

To maintain a consistent cracking pressure, the first adjustable nut 13 needs to stay in the position where it is placed after it is adjusted. A first thread lock device 15 is shown. By way of example, the first thread lock device 15 may be a nylon plug that is placed within a hole in the first threaded stem 18. The nylon plug will contact the threads of the first adjustment nut 13 and cause a resistance to movement of the first adjustment nut 13. In this way the adjustment to the first cracking pressure is likely to remain in the same place, even if the pressure relief valve is used in an environment with high levels of vibration or shock.

FIG. 2 also shows in dotted lines a portion of an example housing 40 with a pressure relief port 41. The example embodiment in FIG. 2 shows the first body 12 of the pressure relief valve inserted into the pressure relief port 41 of the enclosed housing 40. The enclosed housing has an exterior 42 and an interior 43. Two seals 104 and 105 are shown which seal the pressure relief port 41 from the outside environment. Referring to FIG. 2, the first valve 10 may include a first poppet 11 with a first poppet seating surface 31 that may have a first flat portion 32 The first valve 10 may include a first body 12 with a first body seating surface 33 having a second flat portion 34. The first flat portion 32 and the second flat portion 34 may be opposing. The first valve 10 may include a first valve seal 16 between the first poppet seating surface 31 and the first body seating surface 33.

Figure 3:
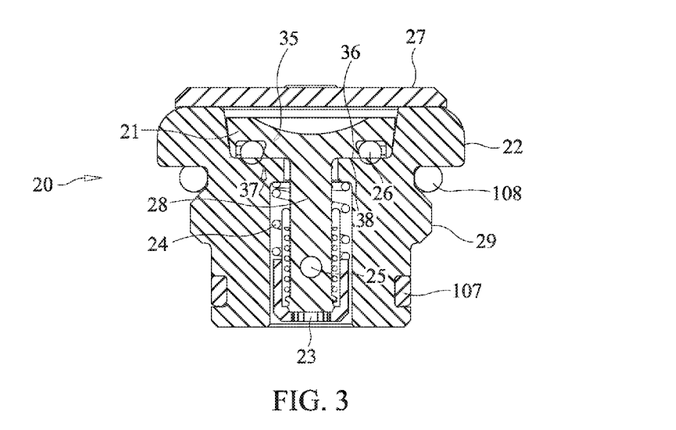
FIG. 3 is cut away view of the second stage of an example pressure relief valve.

FIG. 3 shows an example second stage 20 of the pressure relief valve of FIG. 1. The example second stage valve 20 includes a second poppet 21, connected to a second threaded stem 28. In this example embodiment, the second stage 20 is similar to the first stage 10 shown in FIG. 2, with the same operation of a second adjustment nut 23, and a second spring 24. A second valve seal 26 is also part of the example valve shown in FIG. 3, and prevents exterior fluid from entering the valve. The example second stage valve 20 also includes a second thread lock device 25, which may be a nylon plug and operate in the same manner as the first thread lock device 15. Referring to FIG. 3, the second poppet 21 may include a second poppet seating surface 35 that may have a third flat portion 36. The second body 22 may include a second body seating surface 37 having a fourth flat portion 38. The third flat portion 36 and the fourth flat portion 38 may be opposing. The second valve 20 may include a second valve seal 26 between the second poppet seating surface 35 and the second body seating surface 37.

The second body 22 of the example second stage valve 20 is designed to be inserted into the opening 17 of the first body 12 shown in FIG. 2. To ensure a proper seal to the exterior environment, multiple redundant seals, 107 and 108 are used in this example. The example second body 22 also includes threads 29 to connect with the threaded joint 19 of the first body 12.

Figure 4:
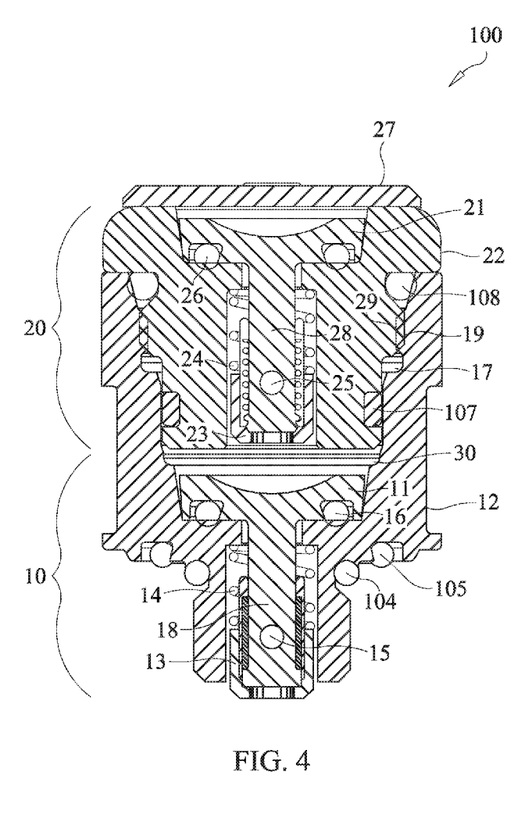
FIG. 4 is a cut away view of an embodiment of the pressure relief valve with the first stage of FIG. 2 assembled with the second stage of FIG. 3.

FIG. 4 shows an example arrangement with the first body 12 of FIG. 2 assembled with the second body 22 of FIG. 3 to form a valve with two separate valve assemblies; a first stage valve 10 and a second stage valve 20. In the example embodiment, these assemblies are screwed together at the threaded joint 19. This joint is sealed by at least two and in this case three redundant o-rings 107 and 108 which seal the interior cavity between the first and second stage valves as well as protect the threaded joint from the high pressure environment, such as sea water. In this example, each valve consists of a body 12 and 22, a poppet 11 and 21 (with locking feature 15 and 25), a spring 14 and 24 and an adjustable nut 13 and 23. All parts in the foregoing example which are exposed to sea water may be Titanium, coated to reduce galvanic corrosion.

With the first stage 10 and second stage 20 combined in the example of FIG. 4, an enclosed cavity 30 is formed between the first valve and the second valve. This allows fluid with a differential pressure above the cracking pressure of the first valve 10 to pass through the first valve 10 into the enclosed cavity 30. When fluid, moves through the first valve 10 into the cavity 30, this will increase the pressure of fluid inside the enclosed cavity 30, and then cause the pressure inside the enclosed cavity 30 to exceed the cracking pressure of the second valve 20. Fluid will then flow through the second valve 20 and into the high pressure environment, or the environment outside the valve 100.

Figure 5:
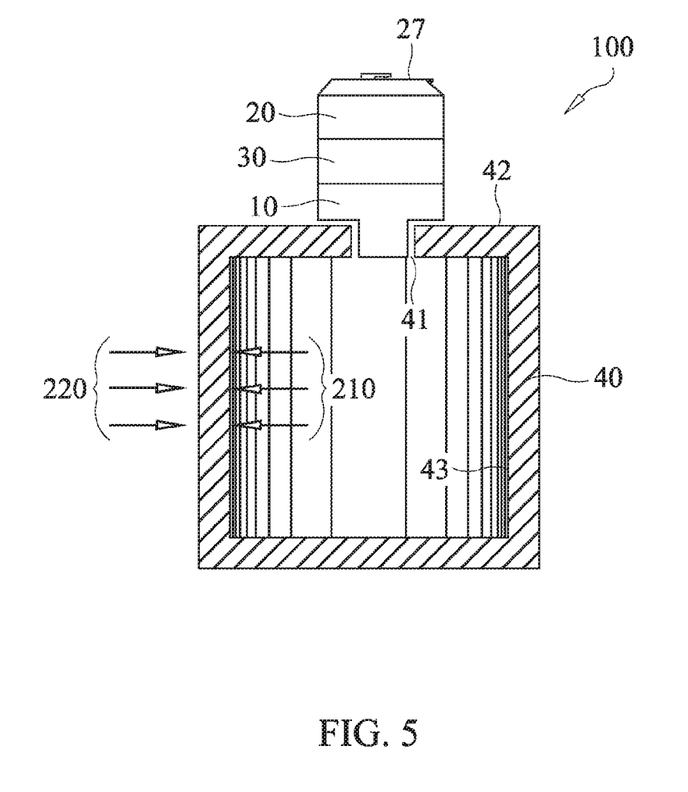
FIG. 5 is a cut away view of an example enclosed housing.

FIG. 5 shows an example enclosed housing 40 with a pressure relief port 41. A pressure relief valve 100 is shown with a first valve 10, a second valve 20 and an enclosed cavity 30 between the first valve 10 and the second valve 20. The pressure relief valve is also shown with a high flow indicator cap 27, that indicates when a high flow has occurred through the pressure relief valve 100. In this example the high flow indicator cap 27 moves or comes off when a high flow of fluid passes through the valve. The enclosed housing 40 has an exterior 42 and an interior 43. Equipment such as electronic sensors and batteries may be place inside the enclosed housing 40. The enclosed housing 40 may be placed in a high pressure environment, such as a deep sea environment. As the enclosed housing 40 is placed into the high pressure environment, outside pressure 220 acts on the exterior of the housing. Inside pressure 210 is likely to be lower than the outside pressure 220 in this environment. The inside pressure may increase, however, due to an imperfect seal, or operation of the equipment inside the enclosed housing 40. When the enclosed housing is removed from the high pressure environment, the inside pressure 210 may exceed the outside pressure 220. A high inside pressure, relative to the outside pressure 220 may cause failure of the enclosed housing 40, or may present a safety hazard when the enclosed housing is opened to service the electronics or replace batteries. Each housing or device will have a range of acceptable pressures for both outside the housing or device, and inside the housing or device, which will be the design operating pressure.

To prevent the safety hazard or failure of the enclosed housing 40, a pressure relief valve 100 can be used to relieve inside pressure 210 well before the failure of the enclosed housing 40 is likely to occur. Example housings are designed to withstand outside pressures 220 in a high pressure environment, up to the design operating pressure of the housing.

In an example embodiment, the pressure relief valve 100 has a design operating pressure of 8780 PSI outside pressure (or 6000 meter depth in the ocean) and may relieve any inside pressure differential greater than 15 PSI. The cracking pressure (which may be 15 PSI max) is the sum of the first and second stage cracking pressures. The cracking pressure of each valve may be factory set by adjusting the respective adjustment nuts 13 and 23. Both of these nuts may be locked to their respective poppets by a nylon upset nylon rod 15 and 25. This feature protects the factory setting from the effects of shock and vibration. The poppets may be tapered as illustrated in the example drawings, so as to provide an increasing cross-section for gas flow as they continue to open. The tapered poppets decrease the pressure drop across the valves and improve flow rate capability.

An example high reliability pressure relief valve may be installed onto a subsea housing into a modified SAE J1926 port with a through hole into the interior cavity of the subsea housing. This connection may be redundantly sealed by o-rings 104 and 105. In service, if the inside pressure differential between 210 and 30 builds up and exceeds the cracking pressure of the first stage valve 10 the force developed from the pressure differential across the poppet exceeds the preset spring force which normally holds the poppet closed and sealed via seal 16. This causes the first stage poppet 11 to open and gas to pass through into the inter-valve cavity 30, pressurizing it as well. If the inside pressure 210 continues to increase or the outside pressure 220 decreases due to changing depth, and the pressure differential across the second stage valve 20 is exceeded in the same manner as the first stage it will open (seal 26) and begin venting interior gas out into the exterior environment 220. The combined cracking pressure of the system is the sum of the cracking pressures of the two individual valves as they are functionally arrange in series.

As inside pressure 210 is relieved, the pressure differential across the second stage 20 will fall below its cracking pressure allowing the second stage spring 24 to close the valve. As long as the inside pressure 210 is not still increasing, the first stage valve pressure differential will then drop to a point where it will also close.

A failure of either valve to seat properly will not result in a housing failure (leaking) as both must be open to allow water to pass into the inner housing chamber.

Figure 6:
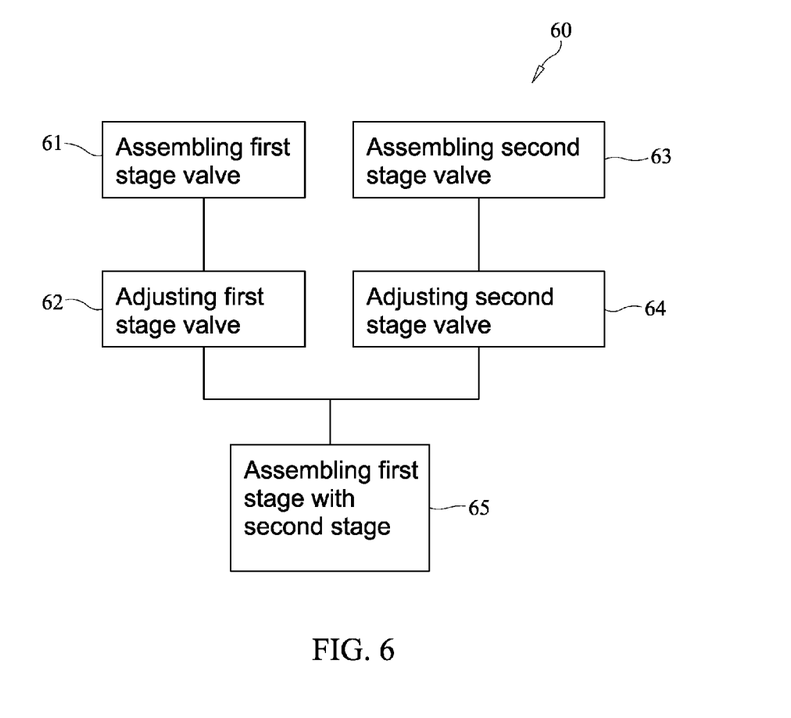
FIG. 6 is a flow chart of an example method of making a pressure relief valve.

FIG. 6 shows an example method of producing a high reliability pressure relief valve 60. A first stage valve may be assembled 61, and independently a second stage valve may be assembled 63. The first stage valve may be adjusted 62 and the second stage valve may be adjusted 64. As shown in the flow diagram of FIG. 6, the first stage and second stage may be assembled independently and at separate times. The first stage and second stage can then be assembled together 65.

The first stage valve may have a cracking pressure that is higher than, the same as, or lower than the cracking pressure of the second stage.

In the embodiments shown and discussed, particular configurations are shown by way of example, and other configurations and devices may be used within the disclosed novel inventive concepts. For example, the shape and configuration of the first body 12 and the second body 22 are shown by way of example. In alternative embodiments, the first body and the second body may be formed together rather than as two separate parts. Similarly, the type and configuration of the valve mechanisms may be any valve mechanism that allows a set cracking pressure and is capable of allowing fluid to flow in one direction, and withstand outside pressure. The drawings also show multiple redundant seals by way of example and not limitation. The invention may be practiced with any number of redundant seals sufficient to prevent fluid from passing from the exterior of the housing 42 into the interior of the housing 43.

In the example embodiments, springs are discussed and illustrated as coil springs, such as metal corrosion resistant material springs. Other springs may be used to provide force to keep the valve closed below the desired cracking pressure. A spring is any elastic object used to store mechanical energy.

The valve and housing discussed above may be used in a high pressure environment, such as in a deep sea environment. The fluid inside the housing may be air, or alternatively, it may be other fluids. The fluid outside the housing may be water, for example seawater, or it may be air or other fluids.

The example configuration shown in FIGS. 2-4 shows an adjustment nut for adjusting the cracking pressure of the valves. In other embodiments other means may be used to set a cracking pressure, which may be adjustable, or alternatively may be set without adjustment. Further, one or both of the valves may have an adjustment available for the cracking pressure.

The examples discussed above have described relieving pressure from inside a housing as an example application of the pressure relief valve. This is not by way of limitation as the pressure relief valve 100 may be used in any environment where fluids are to be controlled and allowed to flow in only one direction based on pressure differentials. The valve disclosed may allow fluid into a normally high pressure system when the pressure drops below a set value, such as in a water or gas supply system, and may be used for other applications other than those where pressure is relieved. In this manner an outside, external or exterior environment is describing the environment where fluid flows after the fluid passes through the second stage of the valve, and an inside, internal, or interior environment is describing the environment from which fluid will flow into the valve when the pressure differential allows the valve to open.

While the principles of the invention have been made clear in illustrative embodiments, there will be immediately obvious to those skilled in the art many modifications of structure, arrangement, proportions, and methods, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. A method of producing a high reliability pressure relief valve for use in a deep sea environment comprising the steps of:

assembling a first stage with a first pressure relief valve for relieving interior fluid pressure from an enclosed housing above a first cracking pressure value;

assembling a second stage with a second pressure relief valve to relieve the interior fluid pressure above a second cracking pressure value;

assembling the first stage with the second stage in series, with an enclosed cavity between the first stage and the second stage, where the first stage relieves the interior fluid pressure above the first cracking pressure value from the enclosed housing into the enclosed cavity, and where the second stage relieves the interior fluid pressure above the second cracking pressure value from the enclosed cavity into the deep sea environment outside the enclosed housing, wherein the first stage and the second stage can withstand at least 300 psi external fluid pressure from the deep sea environment;

wherein the first pressure relief valve includes a first poppet with a first poppet seating surface having a first flat portion, and wherein the first pressure relief valve includes a first body with a first body seating surface having a second flat portion, and wherein the first flat portion and the second flat portion are opposing, and wherein the first pressure relief valve includes a first valve seal between the first poppet seating surface and the first body seating surface.

2. The method according to claim 1, wherein the first cracking pressure value is a higher pressure than the second cracking pressure value.

3. The method according to claim 1, further comprising the step of: adjusting the first stage to set the first cracking pressure value.

4. The method according to claim 3 further comprising the step of: adjusting the second stage to set the second cracking pressure value.

5. The method according to claim 1 further comprising attaching a high flow indicator to the second stage, wherein the high flow indicator is configured to indicate when a high flow of fluid has passed through the second pressure relief valve.

6. The method according to claim 1 further comprising placing a cap next to the second stage to prevent particles from entering the second stage.

7. The method according to claim 6, wherein the cap is attached to the second stage in a manner so that the cap will be removed if a high rate of fluid passes through the second stage.

8. The method according to claim 1 further comprising placing a first seal between the first stage and the second stage, wherein the first seal between the first stage and the second stage can withstand at least 300 psi external fluid pressure from the deep sea environment.

9. The method according to claim 8 further comprising placing a second seal between the first stage and the second stage, wherein the second seal between the first stage and the second stage can withstand at least 300 psi external fluid pressure from the deep sea environment.

* * * * *